US012560807B2

(12) United States Patent
Mizuno et al.

(10) Patent No.: US 12,560,807 B2
(45) Date of Patent: Feb. 24, 2026

(54) HEAD-UP DISPLAY DEVICE

(71) Applicant: Nippon Seiki Co., Ltd., Niigata (JP)

(72) Inventors: Sayaka Mizuno, Niigata (JP); Masanori Endo, Niigata (JP); Kento Hiroki, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 50 days.

(21) Appl. No.: 18/703,252

(22) PCT Filed: Aug. 30, 2022

(86) PCT No.: PCT/JP2022/032530
§ 371 (c)(1),
(2) Date: Apr. 19, 2024

(87) PCT Pub. No.: WO2023/074110
PCT Pub. Date: May 4, 2023

(65) Prior Publication Data
US 2025/0233967 A1 Jul. 17, 2025

(30) Foreign Application Priority Data

Oct. 28, 2021 (JP) ................................. 2021-176750
Apr. 25, 2022 (JP) ................................. 2022-071787

(51) Int. Cl.
*G02B 27/01* (2006.01)
*B60K 35/23* (2024.01)
(Continued)

(52) U.S. Cl.
CPC .............. *G02B 27/01* (2013.01); *B60K 35/23* (2024.01); *B60K 35/60* (2024.01); *B60K 35/80* (2024.01);
(Continued)

(58) Field of Classification Search
CPC .... H04N 9/3194; H04N 9/3182; B60K 35/23; B60K 35/60; B60K 35/80; B60K 37/20;
(Continued)

(56) References Cited

U.S. PATENT DOCUMENTS 10,515,583 B2 * 12/2019 Hwang ................ G09G 3/3208
11,099,471 B2 * 8/2021 Fujita ..................... G03B 21/16
(Continued)

FOREIGN PATENT DOCUMENTS

CN        110705506 A  *  1/2020   ......... G06V 40/1318
JP    2008-134541 A     6/2008
(Continued)

OTHER PUBLICATIONS

English Language Machine Translation of CN-110705506A. (Year: 2020).*

(Continued)

*Primary Examiner* — Jason M Mandeville
(74) *Attorney, Agent, or Firm* — Rimon P.C.

(57) ABSTRACT

Provided is a head-up display device that enables display with more accurate quality. A head-up display device of the present disclosure comprises: a light source that emits light at a predetermined brightness and that emits illumination light; a display element that generates display light by being illuminated with the illumination light; a light sensor that, when illumination light is incident thereon, outputs an illumination light amount signal corresponding to the illumination light amount; and a light source controller that controls the light emission of the light source in response to the illumination light amount signal. The light source controller controls the light source, on the basis of deterioration information indicating the degree of deterioration due to aging of the light sensor, in a first mode in which light is emitted at a first brightness in a case where the deterioration (Continued)

of the light sensor is small, and in a second mode in which light is emitted at a second brightness lesser than the first brightness in a case where the deterioration of the light sensor is large.

9 Claims, 8 Drawing Sheets

(51) Int. Cl.

| | |
|---|---|
| *B60K 35/60* | (2024.01) |
| *B60K 35/80* | (2024.01) |
| *B60K 37/20* | (2024.01) |
| *G09G 3/32* | (2016.01) |
| *G09G 3/34* | (2006.01) |
| *G09G 5/10* | (2006.01) |
| *H04N 9/31* | (2006.01) |

(52) U.S. Cl.
CPC .............. *B60K 37/20* (2024.01); *G09G 3/32* (2013.01); *G09G 3/3406* (2013.01); *G09G 3/346* (2013.01); *G09G 5/10* (2013.01); *H04N 9/3194* (2013.01); *G02B 2027/0118* (2013.01); *G09G 2320/0233* (2013.01); *G09G 2320/041* (2013.01); *G09G 2320/043* (2013.01); *G09G 2320/0626* (2013.01); *G09G 2320/0666* (2013.01); *G09G 2330/08* (2013.01); *G09G 2360/145* (2013.01); *G09G 2380/10* (2013.01); *H04N 9/3182* (2013.01)

(58) Field of Classification Search
CPC ........ G09G 3/32; G09G 3/3406; G09G 3/346; G09G 2320/0233; G09G 2320/041; G09G 2320/043; G09G 2320/0626; G09G 2320/0666; G09G 2360/145; G09G 2380/10; G09G 2330/08; G09G 5/10; G02B 2027/0118; G02B 27/01

USPC ............................................................. 345/7
See application file for complete search history.

(56) References Cited

U.S. PATENT DOCUMENTS

| | | | | |
|---|---|---|---|---|
| 11,741,867 | B2 * | 8/2023 | Lee ...................... | G09G 3/3258 |
| | | | | 345/690 |
| 2008/0062118 | A1 * | 3/2008 | Park .................... | G09G 3/3413 |
| | | | | 345/102 |
| 2010/0066645 | A1 | 3/2010 | Ishii et al. | |
| 2018/0308422 | A1 * | 10/2018 | Hwang ............... | G09G 3/3208 |
| 2020/0371419 | A1 * | 11/2020 | Fujita .................... | G03B 21/16 |
| 2022/0005391 | A1 | 1/2022 | Toratani et al. | |
| 2022/0208044 | A1 * | 6/2022 | Lee ...................... | G09G 3/3258 |
| 2023/0352504 | A1 * | 11/2023 | Mao ................... | H10F 39/8057 |

FOREIGN PATENT DOCUMENTS

| | | | | |
|---|---|---|---|---|
| JP | 2015-65392 | A | | 4/2015 |
| JP | 2015-132658 | A | | 7/2015 |
| JP | 2017105291 | A | * | 6/2017 |
| JP | 2018-008578 | A | | 1/2018 |
| JP | 2018-121288 | A | | 8/2018 |
| JP | 2019-158642 | A | | 9/2019 |
| JP | 2020-21031 | A | | 2/2020 |
| JP | 2020-194117 | A | | 12/2020 |
| WO | 2020/105271 | A1 | | 5/2020 |

OTHER PUBLICATIONS

English Language Machine Translation of JP-2017105291A. (Year: 2017).*

International Search Report received in PCT Application No. PCT/JP2022/032530, dated Nov. 15, 2022.

* cited by examiner

HEAD-UP DISPLAY DEVICE

CROSS-REFERENCE TO RELATED APPLICATIONS

This application is the U.S. National Phase under 35 U.S.C. § 371 of International Application No. PCT/JP2022/032530, filed on Aug. 30, 2022, which claims the benefit of foreign priority to Japanese Patent Application No. 2021-176750 filed on Oct. 28, 2021, and Japanese Patent Application No. 2022-071787 filed on Apr. 25, 2022, the entire contents of each of which are hereby incorporated by reference.

TECHNICAL FIELD

The present invention relates to a head-up display device.

BACKGROUND ART

A conventional head-up display device is disclosed in, for example, Patent Document 1. The head-up display device described in Patent Document 1 is attached to the inside of an instrument panel of a vehicle and projects display light emitted from a display device onto a windshield (projection member) of the vehicle to display a virtual image to a user (driver) of the vehicle.

Furthermore, for example, Patent Document 2 discloses the use of a digital micromirror device (DMD) as an optical engine of a conventional head-up display device. The optical engine includes a detection circuitry using a photosensor to detect the light intensity of each light emitting diode and performs feedback control so that a light source outputs light at an accurate brightness.

PRIOR ART DOCUMENT

Patent Document

Patent Document 1: Japanese Unexamined Patent Publication No. 2017-105291
Patent Document 2: Japanese Unexamined Patent Publication No. 2015-132658

SUMMARY OF THE INVENTION

Problems to be Solved by the Invention

Such a head-up display device is mounted on a vehicle and is desired to have performance that may withstand use in various situations. The use environment is, for example, a situation of use for a long period of time of about 10 years, a situation of a high temperature due to not only changes in the temperature environment outside the vehicle but also irradiation of sunlight or heat generation of a light source element, or a situation in which the device is exposed to strong light emitted by the device itself. However, for the head-up display device, there is a requirement to reduce the possibility of occurrence of inaccurate display even after such a use environment.

Therefore, an object of the present invention is to, with focus on the above-described issue, provide a head-up display device that reduces the possibility of occurrence of inaccurate display.

Solution to Problem

A head-up display device according to the present invention includes: a light source that emits light at a predetermined brightness and emits illumination light; a display element that is irradiated with the illumination light to generate display light; a light sensor that, when the illumination light is incident, outputs an illumination light amount signal corresponding to an illumination light amount; and a light source controller that controls light emission of the light source in accordance with the illumination light amount signal, and the light source controller controls the light source based on deterioration information indicating a degree of age deterioration of the light sensor in a first mode in which light is emitted at a first brightness when deterioration of the light sensor is small, and in a second mode in which light is emitted at a second brightness lower than the first brightness when deterioration of the light sensor is large.

According to another aspect, the head-up display device according to the present invention includes: a light source that emits light at a predetermined brightness and emits illumination light; a display element that is irradiated with the illumination light to generate display light; a light sensor that, when the illumination light is incident, outputs an illumination light amount signal corresponding to an illumination light amount; and a light source controller that controls light emission of the light source in accordance with the illumination light amount signal, and the light source includes a red light emitting diode (LED), a green LED, and a blue LED, and the light source controller stops a further increase in a current amount flowing through the light source when a current amount flowing through the blue LED reaches a predetermined upper limit current amount as a result of increasing the current amount flowing through the blue LED in accordance with the illumination light amount signal.

According to another aspect, the head-up display device according to the present invention includes: a light source that emits light at a predetermined brightness and emits illumination light; a display element that is irradiated with the illumination light to generate display light; a light sensor that, when the illumination light is incident, outputs an illumination light amount signal corresponding to an illumination light amount; and a light source controller that controls light emission of the light source in accordance with the illumination light amount signal, and the light sensor includes: a substrate; a light receiving unit fixed onto the substrate; an adhesive that fixes the light receiving unit to the substrate; and a mask that covers the adhesive to prevent the illumination light from entering the adhesive.

BRIEF DESCRIPTION OF THE DRAWINGS

FIG. 5 is a diagram illustrating a mode of a conventional light sensor 50a.

FIG. 6 is a diagram illustrating a mode of the conventional light sensor 50a after age deterioration.

FIG. 7 is a diagram illustrating a mode of a light sensor 50 according to a third embodiment.

MODE FOR CARRYING OUT THE INVENTION

Modes of the present disclosure will be described in the following order.

[First Embodiment]
<1-1. Description of Configuration>
<1-2. Description about Operation of Light Source Controller>
[Second Embodiment]
[Third Embodiment]
[Modification]

First Embodiment

<1-1. Description of Configuration>

Figure 1:
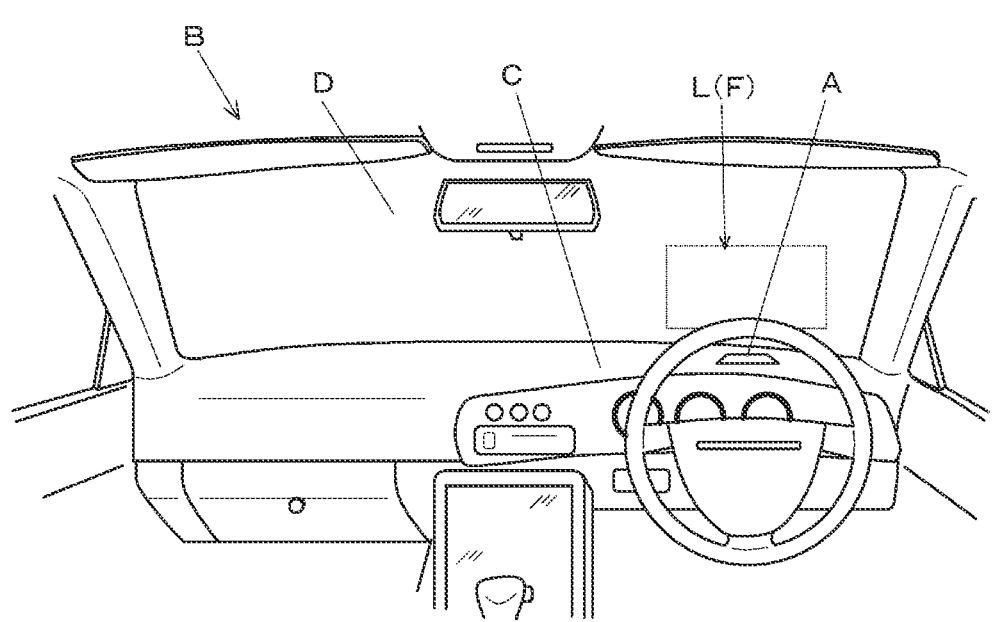
FIG. 1 is a diagram illustrating an in-vehicle example of a head-up display device A according to a first embodiment of the present invention.
Figure 2:
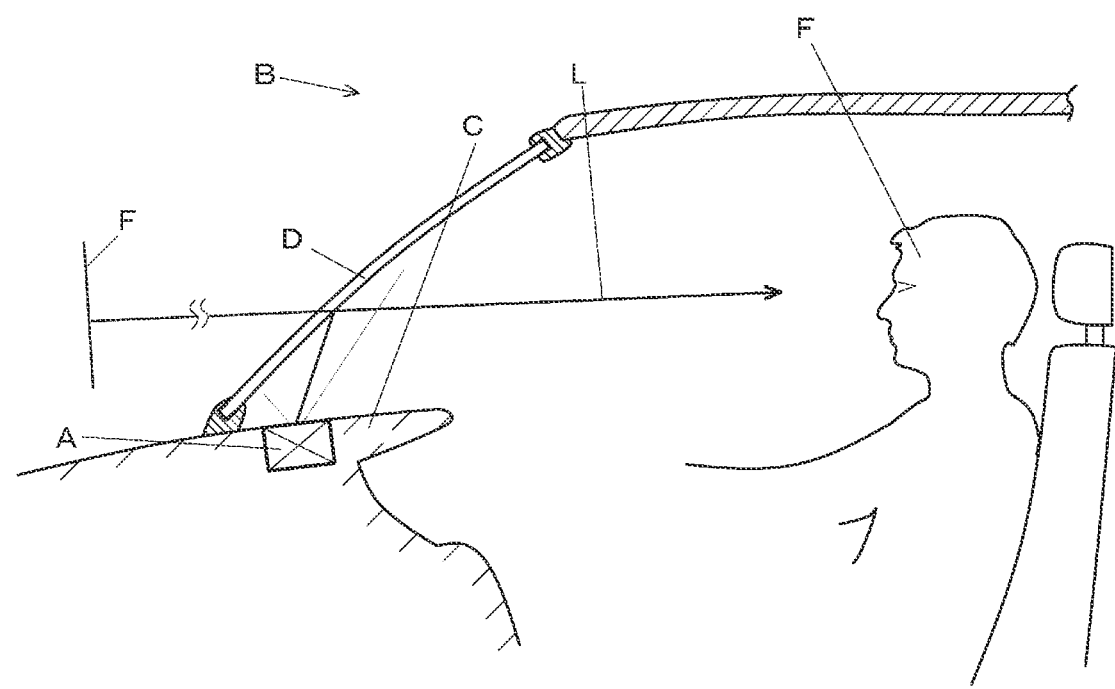
FIG. 2 is a cross-sectional view illustrating an in-vehicle example of the head-up display device A according to the embodiment.

A display device according to an embodiment of the present invention is a head-up display device (hereinafter referred to as HUD device) A illustrated in FIGS. 1 and 2. As illustrated in the drawing, the HUD device A is provided on a dashboard C of a vehicle B and emits display light L representing a generated image (vehicle information) toward a windshield D. The display light L reflected by the windshield D is visually recognized by an observer E (mainly, a driver of the vehicle B) as a virtual image F of an image formed in front of the windshield D. Thus, the HUD device A causes the observer E to visually recognize the image as the virtual image F. This image notifies information (e.g., traveling speed, engine speed, and navigation information) on the vehicle B.

Figure 3:
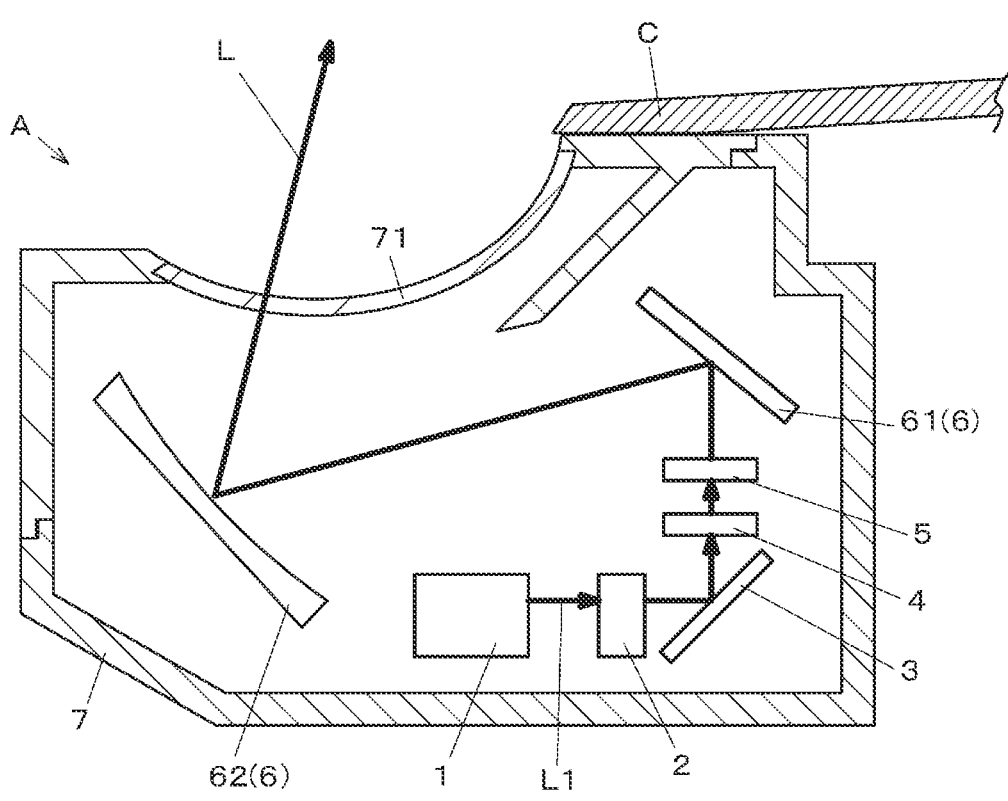
FIG. 3 is a cross-sectional view of the head-up display device A according to the embodiment.
Figure 4:
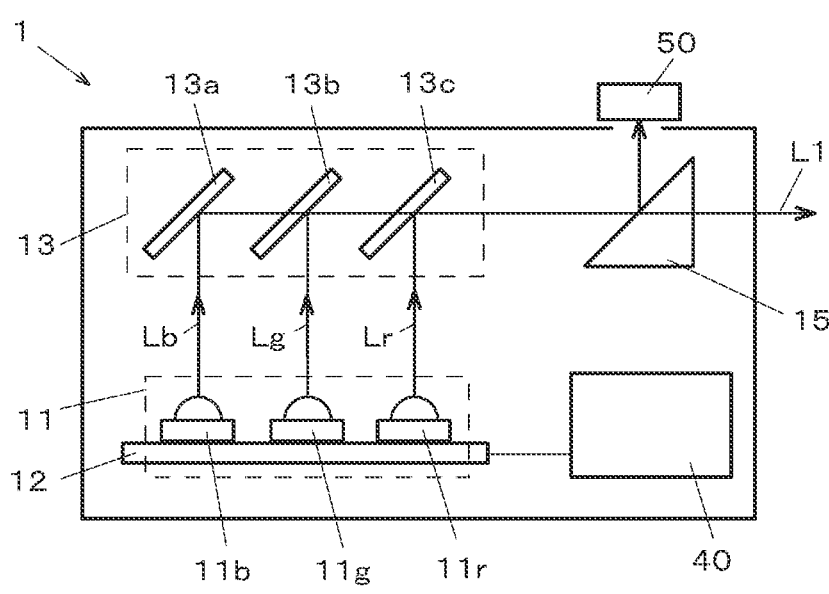
FIG. 4 is a diagram illustrating an illumination device according to the embodiment.

As illustrated in FIG. 3, the HUD device A includes an illumination device 1, an illumination optical system 2, a display element 3, a projection optical system 4, a screen 5, a mirror unit 6 including a plane mirror 61 and a concave mirror 62, and a housing 7 including a light transmitting portion 71. As illustrated in FIG. 4, the illumination device 1 of the HUD device A includes a light source controller 40 and a light sensor 50.

The illumination device 1 emits light (illumination light L1), which will be described below, toward the illumination optical system 2 and, as illustrated in FIG. 4, includes a light source 11, a circuit board 12, a multiplexing unit 13, and a prism 15.

The light source 11 includes, for example, light sources 11r, 11g, and 11b formed of light emitting diodes (LEDs). The light source 11r emits red light Lr, the light source 11g emits green light Lg, and the light source 11b emits blue light Lb. Each of the light sources 11r, 11g, and 11b is driven by a first controller 10 and emits light with predetermined light intensity and timing. According to the present embodiment, the light sources 11r, 11g, and 11b are the independent light sources 11; however, the common light source 11 may emit light in a plurality of colors. Furthermore, the light source 11 may be configured to emit light in a plurality of colors, may be configured to emit light in only two colors, and may be configured to emit light in four or more colors (including white). The circuit board 12 includes a printed circuit board. The light sources 11r, 11g, and 11b are mounted on the circuit board 12.

An integrated circuit that performs a desired function by hardware is applicable to the light source controller 40. The light source controller 40 receives, from the light sensor 50, an illumination light amount signal based on the light intensity of the illumination light L1 (the blue light Lb, the green light Lg, or the red light Lr) emitted from the light source 11, generates a drive signal for driving the light source 11 from the illumination light amount signal, and turns on/off the light source 11 based on the drive signal. Specifically, the light source controller 40 performs feedback control to obtain an appropriate light amount in accordance with the illumination light amount output from the light source 11. Details of the operation of the light source controller 40 will be described in Section 1-2.

The light source controller 40 may further include a controller. The controller includes a microcontroller and may include a CPU, a memory (RAM, ROM), and the like. The CPU controls each unit by reading and executing a program necessary for the operation of the HUD device A previously stored in the ROM. A video signal for displaying an image is input to the controller from a vehicle electronic control unit (ECU) of the vehicle B through low voltage differential signal (LVDS) communication, or the like, and an external illuminance signal (light adjustment signal) around the vehicle B is input to the controller from the vehicle ECU, and based on these signals, the light emission intensity of the light source 11 is adjusted and the display element 3 is caused to display a desired display image.

The multiplexing unit 13 directs the lights Lr, Lg, and Lb, which are emitted from the light sources 11r, 11g, and 11b and reach the multiplexing unit 13, in substantially one direction (toward a brightness unevenness reduction unit 14). Specifically, the multiplexing unit 13 includes a reflecting portion 13a including a reflector and multiplexing portions 13b and 13c including dichroic mirrors that reflect light of specific wavelengths but allow passage of light of other wavelengths.

The reflecting portion 13a is located on the emission side of the light source 11b. The reflecting portion 13a reflects the incident blue light Lb toward the multiplexing portion 13b. The multiplexing portion 13b is located on the emission side of the light source 11g. The multiplexing portion 13b reflects the incident green light Lg toward the multiplexing portion 13c and allows passage of the blue light Lb from the reflecting portion 13a as it is. The multiplexing portion 13c is located on the emission side of the light source 11r. The multiplexing portion 13c reflects the incident red light Lr toward the illumination optical system 20 and allows passage of the light Lb or the light Lg from the multiplexing portion 13b as it is. That is, the illumination light L1 (the blue light Lb, the green light Lg, or the red light Lr) sequentially emitted from the light source 11 is emitted from the multiplexing portion 13c in substantially one direction (toward the brightness unevenness reduction unit 14). The multiplexing unit 13 aligns the optical axes of the light sources 11r, 11g, and 11b and may be omitted when light in a plurality of colors is emitted from the one light source 11.

A brightness unevenness reduction unit may be provided at a subsequent stage of the multiplexing unit 13. The brightness unevenness reduction unit includes a mirror box, an array lens, and the like, and reduces unevenness of light by diffusely reflecting, scattering, and refracting the illumination light L1 from the multiplexing unit 13.

The illumination device 1 emits the light emitted from the light source 11 toward the illumination optical system 2 as the illumination light L1 (the blue light Lb, the green light Lg, or the red light Lr) via the multiplexing unit 13 described above and the prism 15 described below.

The prism 15 includes a transmissive member having a reflectivity of, for example, about 5% and allows passage of most of the illumination light L1 having reached the prism 15 via the multiplexing unit as it is, but reflects a part of the light toward the light sensor 50.

The light sensor 50 uses, for example, a detection element including a photodiode and is provided at the position where the illumination light L1 reflected by the prism 15 is received. The light sensor 50 receives a part of the illumination light L1 and detects the light intensity (light amount) of each of the lights Lr, Lg, and Lb in a time-division manner. The light sensor 50 outputs an illumination light amount signal in accordance with the detected light intensity. The illumination light amount signal is a voltage value converted based on the current output from the photodiode, but may be any various electric signals capable of representing the degree of the light amount.

Since the light sensor 50 may be able to detect the light intensity of each of the lights Lr, Lg, and Lb, the light sensor 50 may be provided, not in the optical path of the illumination light L1 but, for example, at the position where the light intensity of each of the lights Lr, Lg, and Lb before multiplexing may be detected. The light sensor 50 may be appropriately provided at the position where the light intensity of a part of the illumination light L1 emitted from the illumination optical system 2 may be detected. The function of the light sensor 50 will be described below in detail.

The illumination optical system 2 includes a concave lens, or the like, and adjusts the illumination light L1 emitted from the illumination device 1 to the size corresponding to the display element 3.

A DMD including a plurality of movable micromirrors is applicable to the display element 3, and each mirror is controlled in either an ON state or an OFF state so that the illumination light L1 emitted from the illumination optical system 2 is reflected as appropriate. The display element 3 reflects the illumination light L1 in this manner to thus project an image (the light for generating an image) toward the projection optical system 4.

Specifically, an electrode is provided under the micromirror, and each mirror is driven by the electrode at a very short cycle (e.g., a microsecond cycle) so that each mirror enters an On state or an Off state. Each mirror is movable with a hinge as a fulcrum, and when the mirror is in an ON state, the mirror surface is inclined by +12 degrees with the hinge as a fulcrum, and when the mirror is in an OFF state, the mirror surface is inclined by −12 degrees with the hinge as a fulcrum. The mirror in the ON state reflects the illumination light L1 from the illumination optical system 2 toward the projection optical system 4, and the mirror in the OFF state does not reflect the illumination light L1 toward the projection optical system 4. The display element 3 projects the image (the display light L) toward the projection optical system 4 by individually driving each of the mirrors.

The projection optical system 4 includes a concave lens, a convex lens, or the like, and is an optical system to efficiently project the display light L from the display element 3 onto the screen 5.

The screen 5 includes a holographic diffuser, a microlens array, a diffusion plate, and the like, receives the display light L from the projection optical system 4 on the rear surface (surface on the display element 3 side), and displays the image on the front surface (the mirror unit 6 side).

The plane mirror 61 reflects the display light L representing the image displayed on the screen 5 toward the concave mirror 62. The concave mirror 62 reflects the display light L, which has arrived from the plane mirror 61, by the concave surface and emits the reflected light toward the windshield D. Accordingly, the formed virtual image F is larger than the image displayed on the screen 5. The display light L reflected by the concave mirror 62 reaches the windshield D via the light transmitting portion 71.

The housing 7 houses the illumination device 1, the illumination optical system 2, the display element 3, the projection optical system 4, the screen 5, the plane mirror 61, the concave mirror 62, and the like, at predetermined positions. The housing 7 is formed of, for example, a light shielding member at an area except for the light transmitting portion 71. The light transmitting portion 71 includes a light transmitting resin such as acrylic and allows passage of the display light L from the concave mirror 62. The light transmitting portion 71 is fitted to the housing 7, for example. The light transmitting portion 71 is formed in, for example, a curved shape so that external light (e.g., sunlight or light from a street lamp) having reached the light transmitting portion 71 is not reflected toward the observer E.

<1-2. Description about Operation of Light Source Controller>

(1)

During routine design and development work, the inventor has found out that the quality of display of a head-up display device including a light sensor as in the present disclosure may change after a long period of use. As a result of more specific cause investigation, the inventor has found out that an age deterioration may occur in the light sensor. The age deterioration of the light sensor mentioned here means a decrease in the light receiving sensitivity of the light sensor. That is, the inventor has found out that, even when a certain amount of light is emitted to the same light sensor, an output light amount signal (illumination light amount signal) changes before and after use under a certain environment, and the light is observed as if it is lower than the light that is supposed to have been emitted.

In a case where such a deterioration occurs, even when the light source 11 achieves the desired brightness, the illumination light amount indicated by the illumination light amount signal output from the light sensor 50 becomes smaller than the actual illumination light amount. Then, since the light source controller 40 performs feedback control in accordance with the illumination light amount signal, the light amount of the light source 11 is increased, and the light emitting operation is performed at a brightness exceeding the desired brightness.

Therefore, the HUD device A according to the present disclosure is configured such that the light source controller 40 may acquire the deterioration information indicating the degree of age deterioration of the light sensor 50. More preferably, the light source controller 40 is configured to be able to acquire age deterioration information on the light receiving sensitivity performance of the light sensor 50.

When the degree of age deterioration of the light sensor 50 indicated by the deterioration information is small, the light source controller 40 controls the light source 11 in a first mode in which light is emitted at a first brightness which is a normal degree. In the first mode, the light source controller 40 performs desired light emission operation control on the light source 11 in accordance with the external illuminance signal or the illumination light amount signal. For example, when the external illuminance is low, in order to reduce the brightness of the light source 11, for example, in the case of PWM control, the duty ratio is reduced, or the peak value of the current value or the voltage value is reduced.

When the degree of age deterioration of the light sensor 50 indicated by the deterioration information is large, the light source controller 40 controls the light source 11 in a second mode in which light is emitted at a second brightness that is lower than the first brightness. In the second mode, since it is determined that the age deterioration of the light sensor 50 progresses from the acquired deterioration information, the light source controller 40 adjusts the control of the light emitting operation of the light source 11 to suppress the brightness.

Preferably, the first brightness and the second brightness described above are not one brightness level, but a series of brightness tables. The brightness table is data indicating a combination of appropriate drive signals for each assumed external illuminance signal. That is, although the light emission of the light source 11 is controlled at various brightness levels in accordance with the external illuminance, it is often insufficient to switch between the first mode and the second mode at only one brightness level. Therefore, it is desirable to switch the brightness table for the light source controller 40 to control the light source 11 instead of switching one specific brightness level between the first mode and the second mode. The second brightness may be a predetermined brightness that is relatively lower than the first brightness and includes, for example, a state in which the light is completely turned off and the brightness is zero. The complete turn-off of the light source 11 at the second brightness includes a case where the light source controller 40 stops the drive signal and a case where the HUD device A is shut down.

That is, the head-up display device A according to the present disclosure comprising:

the light source 11 that emits light at a predetermined brightness and emits the illumination light L1;

the display element 3 that is irradiated with the illumination light L1 to generate the display light L;

the light sensor 50 that, when the illumination light L1 is incident, outputs an illumination light amount signal corresponding to an illumination light amount; and the light source controller 40 that controls light emission of the light source 11 in accordance with the illumination light amount signal, wherein the light source controller 40 controls the light source 11 based on deterioration information indicating a degree of age deterioration of the light sensor 50 in a first mode in which light is emitted at a first brightness when deterioration of the light sensor 50 is small, and in a second mode in which light is emitted at a second brightness lower than the first brightness when deterioration of the light sensor 50 is large.

With this configuration, the light source 11 may emit light at the normal brightness even when the sensitivity of the light sensor 50 is reduced due to age deterioration, and thus the head-up display device is obtained, in which the possibility of occurrence of inaccurate display is reduced.

(2)

According to the mode (1), the deterioration information may have the following configuration. Specifically, the deterioration information may be based on, for example, the total light emission time of the light source 11, and the light source controller 40 may calculate, store, or acquire the deterioration information indicating that the degree of deterioration of the light sensor 50 is larger as the total light emission time of the light source 11 is longer.

The light source controller 40 may adjust the degree of the second brightness in accordance with such deterioration information.

That is, in the head-up display device A according to the present disclosure, the deterioration information is based on a total light emission time of the light source 11 and means that the deterioration of the light sensor 50 is larger as the total light emission time is longer.

With this configuration, the light source 11 may emit light at the normal brightness in accordance with the degree of deterioration of the light sensor 50 when the sensitivity of the light sensor 50 decreases due to age deterioration, and thus the head-up display device is obtained, in which the possibility of occurrence of inaccurate display is reduced.

(3)

According to the mode (1), the deterioration information may have the following configuration. Specifically, it may be based on for example a total operating time of the light source controller 40, and the light source controller 40 may calculate, store, or acquire the deterioration information indicating that the degree of deterioration of the light sensor 50 is larger as the total operating time of the light source controller 40 is longer.

The total operating time may be, for example, a total amount of a start-up period in which the light source controller 40 wakes up or a period in which the light source controller 40 is in an enable state in which a driving signal, which is a control signal for the light source 11, may be output, excluding a time in which the light source controller 40 sleeps or shuts down.

The light source controller 40 may adjust the degree of the second brightness in accordance with such deterioration information.

That is, in the head-up display device A according to the present disclosure, the deterioration information is based on a total operating time of the light source controller 40 and means that the deterioration of the light sensor 50 is larger as the total operating time is longer.

With this configuration, the light source 11 may emit light at the normal brightness in accordance with the degree of deterioration of the light sensor 50 when the sensitivity of the light sensor 50 decreases due to age deterioration, and thus the head-up display device is obtained, in which the possibility of occurrence of inaccurate display is reduced.

(4)

In the head-up display device A according to the present disclosure, according to the mode (1), the deterioration information is based on an elapsed time from a past time, which is an initial activation time by a user or a manufacturing time of the light source controller 40, to a current time and means that the deterioration of the light sensor 50 is larger as the elapsed time is longer.

With this configuration, the light source 11 may emit light at the normal brightness even when the sensitivity of the light sensor is reduced due to age deterioration, and thus the head-up display device is obtained, in which the possibility of occurrence of inaccurate display is reduced.

(5)

According to the mode (1), the HUD device may have the following configuration.

The HUD device A also has a difference in the display performance for each individual in accordance with the manufacturing tolerance of components. In order to eliminate this difference, the HUD device A performs calibration at the manufacturing stage. In this calibration, a parameter of the controller is changed so that the HUD device A may achieve an appropriate display mode for various inputs.

According to this mode, a pre-deterioration output value is stored in the light source controller 40 in the calibration step. The pre-deterioration output value may be, for example, data of a certain type of table. The table may be data obtained by combining the light emission pattern input to the light source 11 at the time of calibration and the output value of the light sensor 50 when the light source 11 emits light in the light emission pattern. That is, the pre-deterioration output value is data indicating the output value of the light sensor 50 before deterioration with respect to the light emission control operation performed on the light source 11 by the light source controller 40.

The light source controller 40 may acquire the post-deterioration output value each time. The post-deterioration output value is, for example, table data obtained by combining a drive signal (light emission pattern) under the use environment of the user and an illumination light amount signal at the time of control by the drive signal.

The light source controller 40 compares the pre-deterioration output value with the post-deterioration output value, and when the post-deterioration output value is continuously lower than the pre-deterioration output value, the illumination light amount signal indicates a decrease in brightness even in the same operating environment. At this time, the light source controller 40 may calculate, save, and store the deterioration information indicating that the light sensor 50 is deteriorated.

That is, in the head-up display device A according to the present disclosure, the light source controller 40 stores a pre-deterioration output value that is an output value of the light sensor 50 when the light source 11 is controlled in a specific light emission pattern (drive signal) at a time of calibration in a manufacturing stage, acquires a post-deterioration output value that is an output value of the light sensor 50 when the light source 11 is controlled in the light emission pattern, and acquires the deterioration information indicating that the deterioration of the light sensor is larger as a degree of continuous decrease in the post-deterioration output value in comparison with the pre-deterioration output value is larger.

With this configuration, even when the sensitivity of the light sensor 50 is deteriorated due to any event (for example, a temperature change or irradiation of strong light), a decrease in the sensitivity of the light sensor 50 may be appropriately sensed under the use environment, and the light source 11 may emit light at a more normal brightness. As a result, the head-up display device is obtained, in which the possibility of occurrence of inaccurate display is reduced.

(6)

According to the mode (5), the light source controller 40 of the head-up display device A further stores an age deterioration estimation amount of the light emission performance of the light source 11. The age deterioration estimation amount may be, for example, table data indicating a drop in the brightness performance with respect to the use time in a case where the brightness performance at the beginning of manufacturing is 100.

When comparing the pre-deterioration output value and the post-deterioration output value, the light source controller 40 controls the light source 11 in the first mode when it is determined that the decrease is in a range caused by the age deterioration estimation amount of the light source 11 even in a case where the post-deterioration output value is lower than the pre-deterioration output value.

In other words, the light source controller 40 controls the light source 11 in the second mode only when the post-deterioration output value is lower than the pre-deterioration output value and the degree of the decrease is equal to or more than the one caused by the age deterioration estimation amount of the light emission performance of the light source 11.

That is, in the head-up display device A according to the present disclosure, the light source controller 40 controls the light source 11 in the second mode only when a decrease in the post-deterioration output value with respect to the pre-deterioration output value is larger than a decrease due to an age deterioration estimation amount of light emission performance of the light source 11.

With this configuration, it is possible to determine whether the drop in the post-deterioration output value is caused by the age deterioration of the light sensor 50 or the age deterioration of the light emission performance of the light source 11, and the light source 11 may emit light at a more normal brightness. As a result, the head-up display device is obtained, in which the possibility of occurrence of inaccurate display is reduced.

(7)

The inventor further conducted design, development, and verification work on the configuration of (1). As a result, the inventor has found out that the chromaticity of the virtual image F may be shifted when the deterioration of the light sensor 50 progresses. As a result of further specific work, the inventor has found out that the deterioration having the wavelength characteristic exists in the light sensor 50 when the chromaticity shift occurs.

Specifically, the sensitivity of the light sensor 50 decreases with respect to light having a short wavelength due to age deterioration and, as a result, the light source controller 40 performs feedback control such that the light having a short wavelength in the light source 11 is strongly emitted, and chromaticity shift occurs. In view of this, the inventor has overcome the issue by adopting the following configuration.

That is, in the head-up display device A according to the present disclosure, the light source 11 outputs light at a plurality of wavelengths, and the light source controller 40 relatively largely reduces a brightness for light emission of a relatively short wavelength in a light emitting operation of the light source 11.

With this configuration, the light source 11 may emit light with the normal chromaticity even when the sensitivity of the light sensor 50 with respect to light having a short wavelength is reduced due to age deterioration, and thus the head-up display device is obtained, in which the possibility of occurrence of inaccurate display is reduced.

(8)

In the head-up display device A according to the present disclosure, the light source 11 outputs red light, green light, and blue light, and the light source controller 40 relatively largely reduces a brightness for light emission of the blue light Lb in a light emitting operation of the light source 11.

(9)

In the head-up display device A according to the present disclosure, the light source 11 outputs white light, and the light source controller 40 relatively largely reduces a brightness for a short-wavelength component in a light emitting operation of the light source 11.

According to the mode (9), it is desirable to use a color filter or the like to generate the illumination light L1 in a time-division manner.

Second Embodiment

The head-up display device according to the present disclosure may be configured as described below. The second embodiment will be described focusing on a difference from the first embodiment. The configuration described in the description of the first embodiment may be appropriately applied to the configuration not explicitly described in the description of the second embodiment.

(10)

In the head-up display device according to the second embodiment, the light source 11 includes the red LED (the light source 11r), the green LED (the light source 11g), and the blue LED (the light source 11b), and the light source controller stops a further increase in a current amount flowing through the light source 11 when a current amount flowing through the blue LED reaches a predetermined upper limit current amount as a result of increasing the current amount flowing through the blue LED in accordance with the illumination light amount signal.

The inventors have found out that, in the conventional head-up display device, the light receiving sensitivity of the light sensor may change in accordance with the use time due to age deterioration. In particular, the inventors have found out that the change in the light receiving sensitivity may have a wavelength characteristic. For example, due to discoloration (black discoloration or yellow discoloration) of a member forming the light sensor, the light receiving sensitivity of the light sensor may be reduced only with respect to a part of light (for example, blue).

When this phenomenon occurs, inaccurate display may be performed in a device such as a head-up display device including a light source controller that controls the light emission brightness of a light source in accordance with an illumination light amount signal.

In order to solve such an issue, the head-up display device according to the present disclosure is configured to fix the amount of increase in brightness together with the light sources (the light sources 11g and 11r) of other colors when the current amount of the light source (the light source 11b), which emits light of one color, reaches a predetermined upper limit current amount as a result of increasing the current amount in accordance with the illumination light amount signal.

With this configuration, even when the light receiving sensitivity of the light sensor is reduced, the head-up display device is obtained, which reduces the possibility of occurrence of an increase in the brightness more than necessary and thus reduces the possibility of occurrence of inaccurate display.

The light source 11 emits light when a light emission signal such as a current, a voltage, or a rectangular wave for PWM control is input. The light source controller may fix the amount of increase in the brightness of the light source 11 when the voltage, the duty ratio of the rectangular wave for PWM control, or the like, reaches an upper limit amount in addition to the current amount.

The inventors have found out that the decrease in the light receiving sensitivity of the light sensor occurs in particular with respect to blue light (light having a relatively short wavelength), and therefore, with this configuration, the head-up display device is obtained, in which the possibility of occurrence of inaccurate display is more suitably reduced.

Third Embodiment

Figure 7:
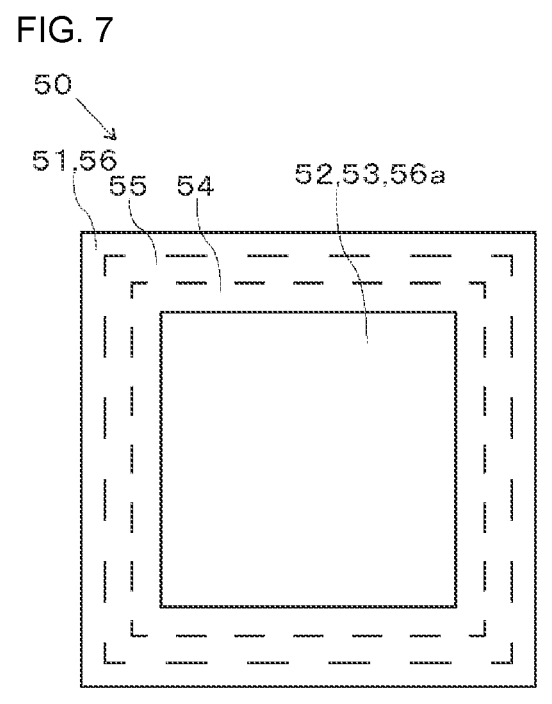
Figure 8:
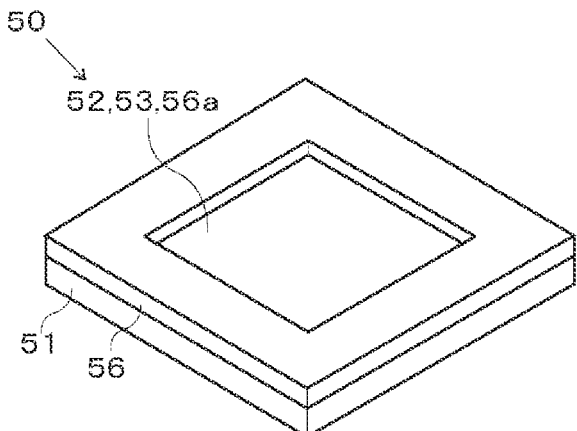
FIG. 8 is a diagram illustrating a mode of the light sensor 50 according to the embodiment.

The head-up display device according to the present disclosure may be configured as illustrated in FIGS. 7 and 8. A third embodiment will be described focusing on a difference from the first embodiment. The configuration described in the description of the first embodiment may be appropriately applied to the configuration not explicitly described in the description of the third embodiment.

(11)

In the head-up display device according to the third embodiment, the light sensor 50 includes:

the lead frame 51 (substrate);

the light receiving unit 52 fixed onto the lead frame 51;

the silver paste 54 (adhesive) that fixes the light receiving unit 52 to the lead frame 51; and the mask 56 that covers the adhesive to prevent the illumination light L from entering the silver paste.

The inventors have found out that the light receiving sensitivity of the light sensor changes as described above. As a result of further analysis, the inventors have found out that this change is caused by transformation of the light sensor.

Figure 5:
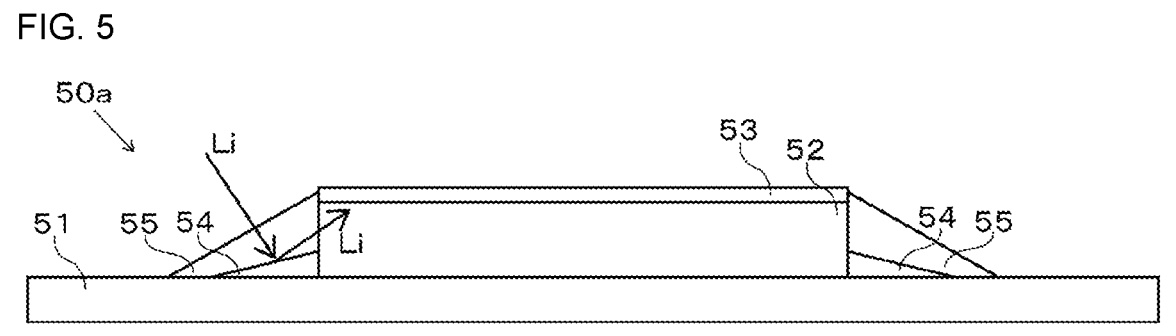
Figure 6:
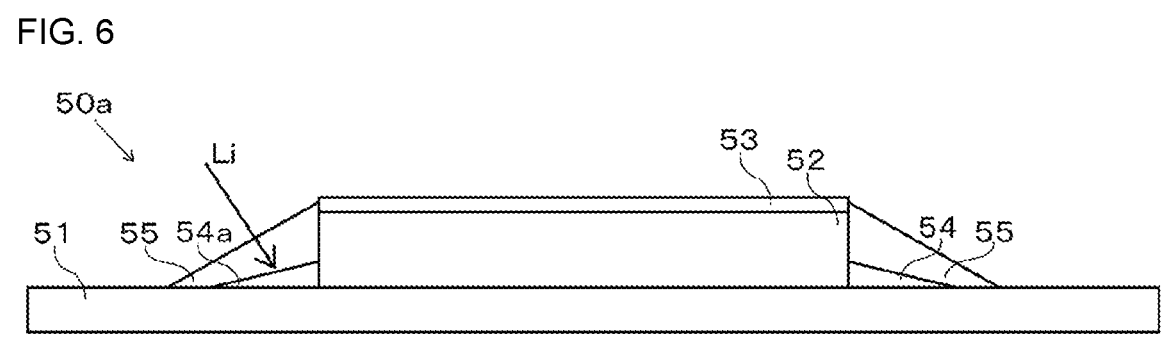

Here, a conventional configuration will be described with reference to FIGS. 5 and 6 illustrating a configuration of a conventional light sensor 50a. As illustrated in FIG. 5, the conventional light sensor 50a includes a lead frame 51, which is an example of a substrate, a light receiving unit 52, a dielectric film 53, silver paste 54, and silicon 55.

The lead frame 51 is a connection member that electrically connects a semiconductor device mounted on the surface to a circuit board or the like.

When predetermined light is incident, the light receiving unit 52 generates an illumination light amount signal that is a voltage or a current. The light receiving unit 52 includes, for example, a photodiode.

The dielectric film 53 is formed to cover a light receiving surface of the light receiving unit 52. The dielectric film 53 is formed to allow passage of light and protect the light receiving surface of the light receiving unit 52.

The silver paste 54 is an adhesive including a mixture of silver flake and epoxy resin and fixes the light receiving unit 52 to the lead frame 51.

The silicon 55 is formed to cover the silver paste 54 and protects the silver paste 54 and fixes the light receiving unit 52 in an auxiliary manner.

When the illumination light is incident, the conventional light sensor 50a configured as described above also receives reflection light Li incident on and reflected by silver paste 54a in addition to the light directly incident on the light receiving unit 52, and thus generates the illumination light amount signal.

However, the inventors have found out that yellow discoloration occurs in the silver paste 54a in the light sensor 50a illustrated in FIG. 6 in which age deterioration has occurred. When yellow discoloration occurs in the silver paste 54a, the reflection efficiency of the reflection light Li decreases. In particular, since the reflectivity for blue light (short-wavelength light) is greatly reduced due to yellow discoloration, the light receiving sensitivity of the light sensor 50a, in which the age deterioration has occurred, is relatively greatly reduced in particular for blue light.

Therefore, in the light sensor 50 of the head-up display device according to the third embodiment, a mask 56 covering the silver paste 54*a* is provided. The mask 56 covers the silver paste 54*a* when viewed from the direction in which the illumination light is incident and reduces the illumination light incident on the silver paste 54*a*. A light shielding tape, a translucent film, a light shielding case made of a synthetic resin, or the like, is applicable as the mask 56.

With this configuration, the head-up display device is obtained, which may suppress the progress of age deterioration of the silver paste 54*a* and may perform more accurate display.

In particular, in the head-up display device according to the third embodiment, the mask 56 may be a transmissive film that reduces blue light incident on the silver paste 54. In the mode illustrated in FIG. 8, the mask 56 has an opening 56*a* through which the light receiving unit 52 may be seen, but the mask 56 may have no opening. In this case, the mask may cover not only the silver paste 54*a* but also the light receiving unit 52.

<center>Modification</center>

Although the head-up display device according to the present invention has been described as an example with the configuration of the above-described embodiment, the present invention is not limited thereto, and it is a matter of course that various improvements and changes in display may be made in other configurations without departing from the scope of the present invention.

For example, the mode having the light emission pattern has been described as the data included in the pre-deterioration output value and the post-deterioration output value, but the data may not be stored as the light emission pattern, and may be stored as a pattern of a drive signal output from the light source controller 40 to the light source 11. It should be noted that, since both of them exist in a one-to-one relationship in most cases, the effect of the present invention is not substantially affected even if either of them is stored.

<center>DESCRIPTION OF REFERENCE NUMERALS</center>

1 ILLUMINATION DEVICE
2 ILLUMINATION OPTICAL SYSTEM
3 DISPLAY ELEMENT
4 PROJECTION OPTICAL SYSTEM
5 SCREEN
6 MIRROR UNIT
61 PLANE MIRROR
62 CONCAVE MIRROR
7 HOUSING
71 LIGHT TRANSMITTING PORTION
11 LIGHT SOURCE
12 CIRCUIT BOARD
13 MULTIPLEXING UNIT
15 PRISM
50 LIGHT SENSOR
51 LEAD FRAME
52 LIGHT RECEIVING UNIT
53 DIELECTRIC FILM
54 SILVER PASTE
54*a* SILVER PASTE
55 SILICON
56 MASK
A HUD DEVICE (HEAD-UP DISPLAY DEVICE)
B VEHICLE
C DASHBOARD
L DISPLAY LIGHT
L1 ILLUMINATION LIGHT

D WINDSHIELD
E OBSERVER
F VIRTUAL IMAGE

The invention claimed is:

1. A head-up display device comprising:
a light source that emits light at a predetermined brightness and emits illumination light;
a display element that is irradiated with the illumination light to generate display light;
a light sensor that, when the illumination light is incident, outputs an illumination light amount signal corresponding to an illumination light amount; and
a light source controller that controls light emission of the light source in accordance with the illumination light amount signal,
wherein the light source controller controls the light source based on deterioration information indicating a degree of age deterioration of the light sensor
in a first mode in which light is emitted at a first brightness when deterioration of the light sensor is small, and
in a second mode in which light is emitted at a second brightness lower than the first brightness when deterioration of the light sensor is large.

2. The head-up display device according to claim 1, wherein the deterioration information is based on a total light emission time of the light source and means that the deterioration of the light sensor is larger as the total light emission time is longer.

3. The head-up display device according to claim 1, wherein the deterioration information is based on a total operating time of the light source controller and means that the deterioration of the light sensor is larger as the total operating time is longer.

4. The head-up display device according to claim 1, wherein the deterioration information is based on an elapsed time from a past time, which is an initial activation time or a manufacturing time of the light source controller, to a current time and means that the deterioration of the light sensor is larger as the elapsed time is longer.

5. The head-up display device according to claim 1, wherein the light source controller
stores a pre-deterioration output value that is an output value of the light sensor when the light source is controlled in a specific light emission pattern at a time of calibration in a manufacturing stage,
acquires a post-deterioration output value that is an output value of the light sensor when the light source is controlled in the light emission pattern, and
acquires the deterioration information indicating that the deterioration of the light sensor is larger as a degree of continuous decrease in the post-deterioration output value in comparison with the pre-deterioration output value is larger.

6. The head-up display device according to claim 5, wherein the light source controller controls the light source in the second mode only when a decrease in the post-deterioration output value with respect to the pre-deterioration output value is larger than a decrease due to an age deterioration estimation amount of light emission performance of the light source.

7. The head-up display device according to claim 1, wherein the light source outputs light at a plurality of wavelengths, and
the light source controller relatively largely reduces a brightness for light emission of a relatively short wavelength in a light emitting operation of the light source.

8. The head-up display device according to claim 1,
wherein the light source outputs red light, green light, and
   blue light, and
the light source controller relatively largely reduces a
   brightness for light emission of blue light in a light
   emitting operation of the light source.

9. The head-up display device according to claim 1,
wherein the light source outputs white light, and
the light source controller relatively largely reduces a
   brightness for a short-wavelength component in a light
   emitting operation of the light source.

* * * * *